(12) United States Patent
Yin

(10) Patent No.: US 10,795,978 B2
(45) Date of Patent: Oct. 6, 2020

(54) METHOD AND DEVICE FOR IDENTITY AUTHENTICATION

(71) Applicant: ALIBABA GROUP HOLDING LIMITED, Grand Cayman (KY)

(72) Inventor: Yan Yin, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/804,768

(22) Filed: Feb. 28, 2020

(65) Prior Publication Data

US 2020/0201961 A1 Jun. 25, 2020

Related U.S. Application Data

(63) Continuation of application No. 15/327,965, filed as application No. PCT/CN2015/084302 on Jul. 17, 2015, now Pat. No. 10,614,201.

(30) Foreign Application Priority Data

Aug. 7, 2014 (CN) .......................... 2014 1 0386942

(51) Int. Cl.
  *G06F 21/31* (2013.01)
  *H04L 9/32* (2006.01)
  (Continued)

(52) U.S. Cl.
  CPC .............. *G06F 21/316* (2013.01); *H04L 9/32* (2013.01); *H04W 12/06* (2013.01); *H04L 63/08* (2013.01)

(58) Field of Classification Search
  CPC ........ G06F 21/316; H04W 12/06; H04L 9/32; H04L 63/08
  See application file for complete search history.

(56) References Cited

U.S. PATENT DOCUMENTS

| 4,805,222 A | 2/1989 | Young et al. |
| 6,400,836 B2 | 6/2002 | Senior |

(Continued)

FOREIGN PATENT DOCUMENTS

| CN | 101384028 A | 3/2009 |
| CN | 101616210 A | 12/2009 |

(Continued)

OTHER PUBLICATIONS

Search Report for European Application No. 19195242.3 dated Nov. 14, 2019 (7 pages).

(Continued)

*Primary Examiner* — Nelson S. Giddins
(74) *Attorney, Agent, or Firm* — Sheppard Mullin Richter & Hampton LLP

(57) ABSTRACT

Disclosed in the application are a method and device for identity authentication. The method comprises: when the terminal is in the specified stress state, action attribute information of the terminal is collected; the action attribute information is processed by matching with preset sample information; if the action attribute information is matched with the sample information, the authentication is successful, and if the action attribute information is not matched with the sample information, the authentication is failed. By the above method, the terminal can automatically collect the corresponding action attribute information in the process that users perform certain specified operation, and then match and compare with the preset standard information to authenticate the identity of the current user using the terminal. Therefore, the terminal can collect the action attribute information and set up or authenticate it without entering a specific acquisition mode in the process that the user operates and uses the terminal. It avoids interfering with the use (Continued)

of users, and also effectively improves the convenience of operation.

17 Claims, 5 Drawing Sheets

(51) Int. Cl.
  *H04L 29/06* (2006.01)
  *H04W 12/06* (2009.01)

(56) References Cited

U.S. PATENT DOCUMENTS

| | | | |
|---|---|---|---|
| 7,069,187 | B2 | 6/2006 | Kondo et al. |
| 7,986,816 | B1 | 7/2011 | Hoanca et al. |
| 8,447,273 | B1 | 5/2013 | Friedlander et al. |
| 8,819,812 | B1 | 8/2014 | Weber et al. |
| 2001/0036297 | A1 | 11/2001 | Ikegami et al. |
| 2003/0179912 | A1 | 9/2003 | Murase et al. |
| 2006/0078176 | A1 | 4/2006 | Abiko et al. |
| 2006/0080525 | A1 | 4/2006 | Ritter et al. |
| 2006/0293891 | A1 | 12/2006 | Pathuel |
| 2007/0079137 | A1 | 4/2007 | Tu |
| 2007/0236330 | A1 | 10/2007 | Cho et al. |
| 2009/0083850 | A1 | 3/2009 | Fadell et al. |
| 2009/0203355 | A1 | 8/2009 | Clark |
| 2009/0303204 | A1 | 12/2009 | Nasiri et al. |
| 2009/0322691 | A1 | 12/2009 | Chiu |
| 2010/0061600 | A1 | 3/2010 | Niinuma |
| 2010/0248822 | A1 | 9/2010 | Migos et al. |
| 2011/0043475 | A1 | 2/2011 | Rigazio et al. |
| 2011/0056108 | A1 | 3/2011 | McCord et al. |
| 2011/0197270 | A1 | 8/2011 | Kaufman |
| 2011/0312311 | A1 | 12/2011 | Abifaker et al. |
| 2012/0007713 | A1 | 1/2012 | Nasiri et al. |
| 2012/0126941 | A1 | 5/2012 | Coggill |
| 2013/0076485 | A1 | 3/2013 | Mullins |
| 2013/0272586 | A1 | 10/2013 | Russo |
| 2013/0288647 | A1 | 10/2013 | Turgeman |
| 2013/0347101 | A1 | 12/2013 | Wu |
| 2014/0078079 | A1 | 3/2014 | Wang |
| 2014/0160003 | A1 | 6/2014 | Follis et al. |
| 2014/0176437 | A1 | 6/2014 | Aujay et al. |
| 2014/0283005 | A1* | 9/2014 | Avni ............... G06F 21/32 726/16 |
| 2014/0366130 | A1* | 12/2014 | Ikemoto ............ G06F 3/017 726/19 |
| 2015/0220152 | A1 | 8/2015 | Tait et al. |
| 2015/0358760 | A1 | 12/2015 | Kehm |
| 2015/0371023 | A1* | 12/2015 | Chen ............... G06F 21/316 706/12 |
| 2016/0085407 | A1* | 3/2016 | Liu ................ G06F 3/04883 345/173 |

FOREIGN PATENT DOCUMENTS

| | | |
|---|---|---|
| CN | 101639888 A | 2/2010 |
| CN | 101957722 A | 1/2011 |
| CN | 102203794 A | 9/2011 |
| CN | 102509438 A | 6/2012 |
| CN | 102622183 A | 8/2012 |
| CN | 102637105 A | 8/2012 |
| CN | 102724038 A | 10/2012 |
| CN | 102790826 A | 11/2012 |
| CN | 202565358 U | 11/2012 |
| CN | 102938816 A | 2/2013 |
| CN | 103493060 A | 1/2014 |
| CN | 103516682 A | 1/2014 |
| CN | 103593673 A | 2/2014 |
| CN | 103677548 A | 3/2014 |
| CN | 103716543 A | 4/2014 |
| CN | 103927471 A | 7/2014 |
| JP | 62-157966 A | 7/1987 |
| JP | 2001516474 A | 9/2001 |
| JP | 2003-058504 A | 2/2003 |
| KR | 10-2007-0019364 A | 2/2007 |
| KR | 101203542 B1 | 11/2012 |
| KR | 10-2013-0056275 A | 5/2013 |
| WO | 2005/103863 A2 | 11/2005 |

OTHER PUBLICATIONS

First Examination Report for Indian Application No. 201747001587 dated Jan. 14, 2020 (5 pages).
Office Action for Korean Application No. 10-2019-7010788 dated Jan. 6, 2020 (9 pages).
Third Office Action for Chinese Application No. 201410386942.8 dated Mar. 14, 2019 with machine English Translation (12 pages).
Decision of a Patent Grant issued in related Japanese Application No. 2017-506690, dated Nov. 6, 2018, 1 page.
Notice of Decision for Rejection issued in related Korea Application No. 10-2017-7006297, dated Nov. 21, 2018, 7 pages.
International Preliminary Report on Patentability Chapter I for Application No. PCT/CN2015/084302 dated Feb. 7, 2017, 4 pages.
Supplemental Search Report for Chinese Application No. 201410386942.8, dated Aug. 12, 2018, 1 page.
Second Office Action for Chinese Application No. 201410386942.8, dated Aug. 21, 2018, 11 pages.
Office Action for Japanese Application No. 2017-506690, dated May 8, 2018, 6 pages.
Office Action for Korean Application No. 10-2017-7006297, dated May 16, 2018, 9 pages.
First Office Action for Chinese Application No. 201410386942.8, dated Nov. 3, 2017, 6 pages.
Search Report and Written Opinion for European Application No. 15830014.5, dated Dec. 8, 2017, 6 pages.
Search Report for Chinese Application No. 201410386942.8, dated Oct. 25, 2017, 1 page.
International Search Report and Written Opinion for Application No. PCT/CN2015/084302, dated Oct. 16, 2015, 11 pages.
Notice of Allowance for Korean Application No. 10-2019-7010788 dated Mar. 20, 2020.
First Search for Chinese Application No. 201911017192.6 dated Jun. 30, 2020.
First Office Action for Chinese Application No. 201911017192.6 dated Jul. 3, 2020.

* cited by examiner

METHOD AND DEVICE FOR IDENTITY AUTHENTICATION

CROSS REFERENCE TO RELATED APPLICATION

The present application is a continuation of U.S. patent application Ser. No. 15/327,965 filed on Jan. 20, 2017, entitled "METHOD AND DEVICE FOR IDENTITY AUTHENTICATION," which is a National Phase entry application of the International Patent Application No. PCT/CN2015/084302, filed on Jul. 17, 2015, and titled "METHOD AND DEVICE FOR IDENTITY AUTHENTICATION," which claims priority to Chinese Patent Application No. 201410386942.8, filed on Aug. 7, 2014. The entire contents of all of the above applications are incorporated herein by reference in their entirety.

TECHNICAL FIELD

The present application relates to the field of computer technologies, and in particular, to a method and device for identity authentication.

BACKGROUND ART

As the information technology develops, terminals have become an indispensable part of people's life and work. By using a terminal, a user can exchange and share data with other terminals, and can display the data.

In the prior art, a terminal used by a user generally includes a large volume of data (such as transactional data and identity data) of the user, and in order to ensure the security of the data in the terminal, generally the terminal is encrypted and authenticated by using a biometric identification technology having higher security, and the process includes: a user sets encryption information including a biological feature (including a fingerprint, a palm print, a voice, and the like), after the setting is finished, the terminal may use the encryption information to implement self-protection, and only when the user provides a correct biological feature, can the terminal pass the authentication to be operated and used by the user. Since the biological feature is unique, the encryption information using the biometric identification technology is difficult to modify, and is also difficult to leak, thus having strong security.

However, no matter during setting or authentication, the terminal needs to enter a corresponding acquisition mode to collect a biological feature of the user such as a fingerprint, a palm print, and a voice. The collection process is complicated, and meanwhile, the collection of the biological feature will interrupt the current operation of the user. In the process of collection, the user cannot conduct other operations, which interferes with the use of the user, and causes low convenience of operation.

SUMMARY

Embodiments of the present application provide a method and device for identity authentication, for solving the problem that the process of a terminal collecting a biological feature is complicated, interferes with a use state of a user, and has low operation convenience.

A method for identity authentication according to an embodiment of the present application includes:

collecting, by a terminal when a user performs a specified operation, action attribute information of the user in the process of the specified operation;

determining, according to preset standard information, whether the action attribute information is matched with the standard information;

if yes, the authentication being successful, performing corresponding processing according to the specified operation; and otherwise, the authentication being failed, refusing to perform the corresponding processing according to the specified operation.

A device for identity authentication according to an embodiment of the present application includes: a collection module, a determination module, and a processing module, where the collection module is configured to collect action attribute information of a user in the process of a specified operation when the user performs the specified operation;

the determination module is configured to determine, according to preset standard information, whether the action attribute information is matched with the standard information; and the processing module is configured to: when the determination module determines that there is a matching, the authentication is successful, perform corresponding processing according to the specified operation; and when the determination module determines that there is no matching, the authentication is failed, refuse to perform the corresponding processing according to the specified operation.

The embodiments of the present application provide a method and device for identity authentication. In the method, a terminal collects action attribute information of a user in the process of a specified operation when the user performs the specified operation; and determines, according to preset standard information, whether the action attribute information is matched with the standard information; if yes, the authentication is successful, and the terminal performs corresponding processing according to the specified operation; otherwise, the authentication is failed, and terminal refuses to perform the corresponding processing according to the specified operation. By the above method, the terminal may automatically collect corresponding action attribute information in the process that a user performs some specified operations, match and compare the action attribute information with the preset standard information to authenticate the identity of the current user of the terminal; therefore, the terminal can collect the action attribute information and set up or authenticate it without entering a specific acquisition mode in the process that the user operates and uses the terminal, thereby avoiding interfering with the use of users, and also effectively improving the convenience of operation.

BRIEF DESCRIPTION OF THE DRAWINGS

The accompanying drawings described herein, which constitute a part of the present application, are used to provide further understanding of the present application, and exemplary embodiments of the present application and illustrations thereof are used to explain the present application, and are not intended to constitute any improper limitation on the present application. In the accompanying drawings.

DETAILED DESCRIPTION

To make objectives, technical solutions and advantages of the present application more comprehensible, technical solutions of the present application are described clearly and completely through specific embodiments of the present application and corresponding accompanying drawings. Apparently, the described embodiments are merely a part of embodiments rather than all embodiments of the present application. Based on the embodiments of the present application, all other embodiments derived by persons of ordinary skill in the art without any creative effort shall fall within the protection scope of the present application.

Figure 1:
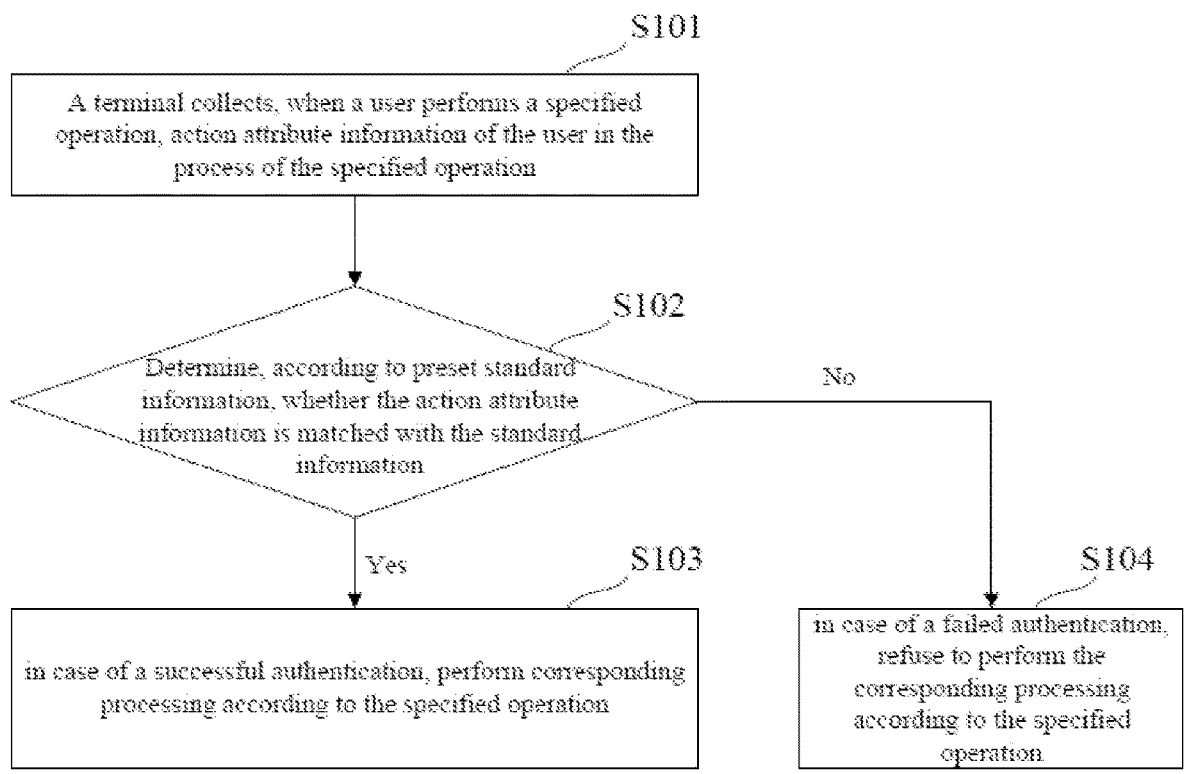
FIG. 1 is a process of identity authentication according to an embodiment of the present application.

FIG. 1 is a process of identity authentication according to an embodiment of the present application, and the process specifically includes the following steps:

S101: A terminal collects, when a user performs a specified operation, action attribute information of the user in the process of the specified operation.

The terminal includes, but not limited to: a mobile terminal such as a cell phone, a tablet computer, a smart band, and smart glasses, as well as a computer terminal, an external input device (such as a mouse and a keyboard) matching the computer terminal, and the like.

In the present application, in order to avoid interfering with using of the terminal by the user, when the terminal authenticates the identity of the user, the terminal will not enter a specific acquisition mode to acquire a biological feature of the user, and in this way, other features of the user need to be collected at the background. Considering that when using the terminal, the user always operates the terminal through corresponding actions, for example, in some actual application scenarios, the user operates a tablet computer or a cell phone by tapping a touch screen with a finger or sliding with a finger; or, when answering a call using a cell phone, the user may raise the cell phone to the ear for conversation. Then, the terminal may collect corresponding action attribute information from the actions generated by the user performing these operations on the terminal.

Specifically, when the user taps the touch screen or slides on the touch screen of the terminal, a force applied to the screen by the finger may be collected by the terminal. When the user answers a call, the acceleration of the terminal in the process of moving with the hand of the user may be collected by the terminal itself. The above information collected by the terminal is the action attribute information in the present application, that is, the action attribute information includes one or more of information about a force applied to the terminal by the user, and acceleration information. In an actual application, different users have different action attribute information, that is, the action attribute information, the same as other types of biological features of the user, is unique.

By means of the action attribute information, the terminal may not enter the corresponding acquisition mode but carry out collection at the background, and therefore, the terminal may not interfere with the process that the user uses the terminal. Definitely, the action attribute information may be collected by a collection process set in the terminal by invoking an element such as a gravity sensor, a gyroscope, and a pressure sensor, and the present application is not limited thereto.

It should be noted that, if the terminal is in a locked state, some applications and system functions inside the terminal may be in a suspended state, for example, works of the screen and sensor of the mobile terminal are both suspended. In such a state, even if the user taps on the terminal, the terminal will not collect the action attribute information. Therefore, in the step S101, only when the user performs a specified operation, can the terminal collect action attribute information during the operation. The specified operation includes, but is not limited to: an operation of inputting by the user with a virtual keyboard in a mobile terminal, an operation of sliding to unlock by the user on a lock-screen interface of a mobile terminal, an operation of sliding to answer a call by the user when there is an incoming call, and the like. By setting the specified operation, the user may use the terminal normally, and at the same time, the terminal may collect the action attribute information at the background.

S102: Determine, according to preset standard information, whether the action attribute information is matched with the standard information; if yes, perform step S103; otherwise, perform step S104.

In the embodiment of the present application, the action attribute information is equivalent to identity information of the user, and for the terminal used by the user, various types of identity information need to be entered in advance to serve as a verification standard for determining whether subsequently input identity information is correct; therefore, in the step S102, corresponding standard information may be preset.

The setting process of the standard information is specifically: each time when the user performs the specified operation, collecting in advance the action attribute information in each process of performing the specified operation, to serve as sample information, determining an action attribute value range according to the sample information, and setting the action attribute value range as the standard information.

When the user uses the terminal, the specified operation may be performed for multiple times, for example, when the user uses a cell phone, the user may frequently use a virtual keyboard in the cell phone to edit short messages, input texts, and the like. At this point, the user tapping the virtual keyboard is a specified operation being performed by the user, then, the user may collect tapping strength of the user in advance in the process that the user taps the virtual keyboard, to serve as the sample information.

Generally, to facilitate calculation, for such a specified operation that the user taps the virtual keyboard, the number of collected tap operations may be preset, for example, 10 tap operations are collected, that is, once the user uses the virtual keyboard on the mobile terminal, the collection process running at the background of the mobile terminal collects tap strengths of the 10 tap operations of the user. Definitely, the number of times of collection may be adjusted and set according to requirements of an actual application, for example, when the user starts an application on the mobile terminal, the user taps an icon of the application only once, and in this case, the number of times of collection may be set to 1.

In an actual application scenario, for the same user, each time the user performs an identical action, action attribute information thereof is not completely identical, for example, the user's strength of tapping a touch screen may vary, and therefore, it is not accurate to collect the action attribute information only once, and in the present application, action attribute information during the specified operation performed by the user may be collected for multiple times, thus obtaining multiple groups of sample information respectively.

After the multiple groups of sample information are obtained, action attribute values corresponding to the action attribute information may be determined. It should be noted that, the action attribute information generally corresponds to a specific action attribute value. For example, the operation of the user tapping a screen of the mobile terminal specifically corresponds to the magnitude of the tap strength; and the operation of the user raising the mobile terminal specifically corresponds a value of acceleration and a direction of the acceleration in the displacement process of the mobile terminal. The sizes of the action attribute values corresponding to the multiple groups of sample information may be different, and a minimum action attribute value and a maximum action attribute value may be determined according to all the action attribute values, thus forming an action attribute value range.

The action attribute value range reflects a difference range of action attribute information collected by the terminal, and as the action attribute value range is determined by collecting multiple groups of sample information, the action attribute value range can substantially accurately reflect the action attribute information when the user performs the specified operation.

In the present application, the determining the action attribute value range according to the sample information specifically includes: determining a first average value of the sample information according to the sample information; determining a second average value of sample information greater than the first average value; determining a third average value of sample information not greater than the first average value; and determining a numerical range from the third average value to the second average value as the action attribute value range.

The first average value reflects an average level of the action attribute values corresponding to the sample information, and compared with the first average value, some action attribute values in the sample information are greater than the first average value, and some are less than the first average value. Therefore, after the first average value is determined, all action attribute values greater than the first average value are averaged to obtain the second average value, and the second average value reflects an average level of all action attribute values greater than the first average value, that is, an average level of maximum values of all action attribute values in the sample information. Likewise, all action attribute values less than the first average value are averaged to obtain the third average value, and the third average value reflects an average level of all action attribute values less than the first average value, that is, an average level of minimum values of all action attribute values in the sample information. Therefore, the numerical range from the third average value to the second average value is determined as the action attribute value range, that is, the standard information.

After setting of the standard information is finished, the standard information may be compared and matched with action attribute information subsequently collected by the terminal, to determine that the user of the terminal is still the current user. The action attribute value range corresponding to the standard information determined in the above steps reflects the average level of the action attribute information of the user. In other words, when the user uses the terminal, all action attribute values corresponding to the action attribute information collected by the terminal basically fall within the action attribute value range. Therefore, the determining whether the action attribute information is matched with the standard information in the step S102 is determining whether attribute values included in the action attribute information fall within the action attribute value range.

S103: If the authentication is successful, perform corresponding processing according to the specified operation.

If the attribute values included in the action attribute information fall within the action attribute value range, it is determined that the action attribute information is matched with the standard information, indicating that the action attribute information complies with the user; in other words, the current user of the terminal is not changed, and is still the original user; therefore, the terminal may perform corresponding processing according to the operation of the user.

S104: If the authentication is failed, refuse to perform the corresponding processing according to the specified operation.

If the action attribute values included in the action attribute information do not fall within the action attribute value range, it is determined that the action attribute information is not matched with the standard information, indicating that the action attribute information is not sent by the user, and may be sent by another user; therefore, to ensure the security of data in the terminal, the terminal may automatically enter a locked state to prevent from being operated by the current user.

It should be noted that, the action attribute information of the user in the process of the specified operation may also not match with the standard information. For example, when the user uses the virtual keyboard in the mobile terminal to input texts, the strength of a tap may exceed the action attribute value range corresponding to the standard information. Then, in this case, if it is directly determined as not matching with the standard information, the normal use of the user may be affected. Therefore, in another scenario of the present application, the determining whether the action attribute information is matched with the standard information may specifically be determining according to a set similarity percentage.

In addition, in the present application, the terminal collects, for multiple times, the action attribute information in the process that the user performs the specified operation, and may continuously update the action attribute value range by using an optimization algorithm such as a Particle Swarm Optimization (PSO) algorithm, to improve the precision of matching.

By means of the above steps, the terminal may automatically collect corresponding action attribute information in the process that the user performs some specified operations, match and compare the action attribute information with the preset standard information to authenticate the identity of a current user of the terminal; therefore, the terminal can collect the action attribute information and set up or authenticate it without entering a specific acquisition mode in the process that the user operates and uses the terminal, thereby avoiding interfering with the use of users, and also effectively improving the convenience of operation.

Figure 2:
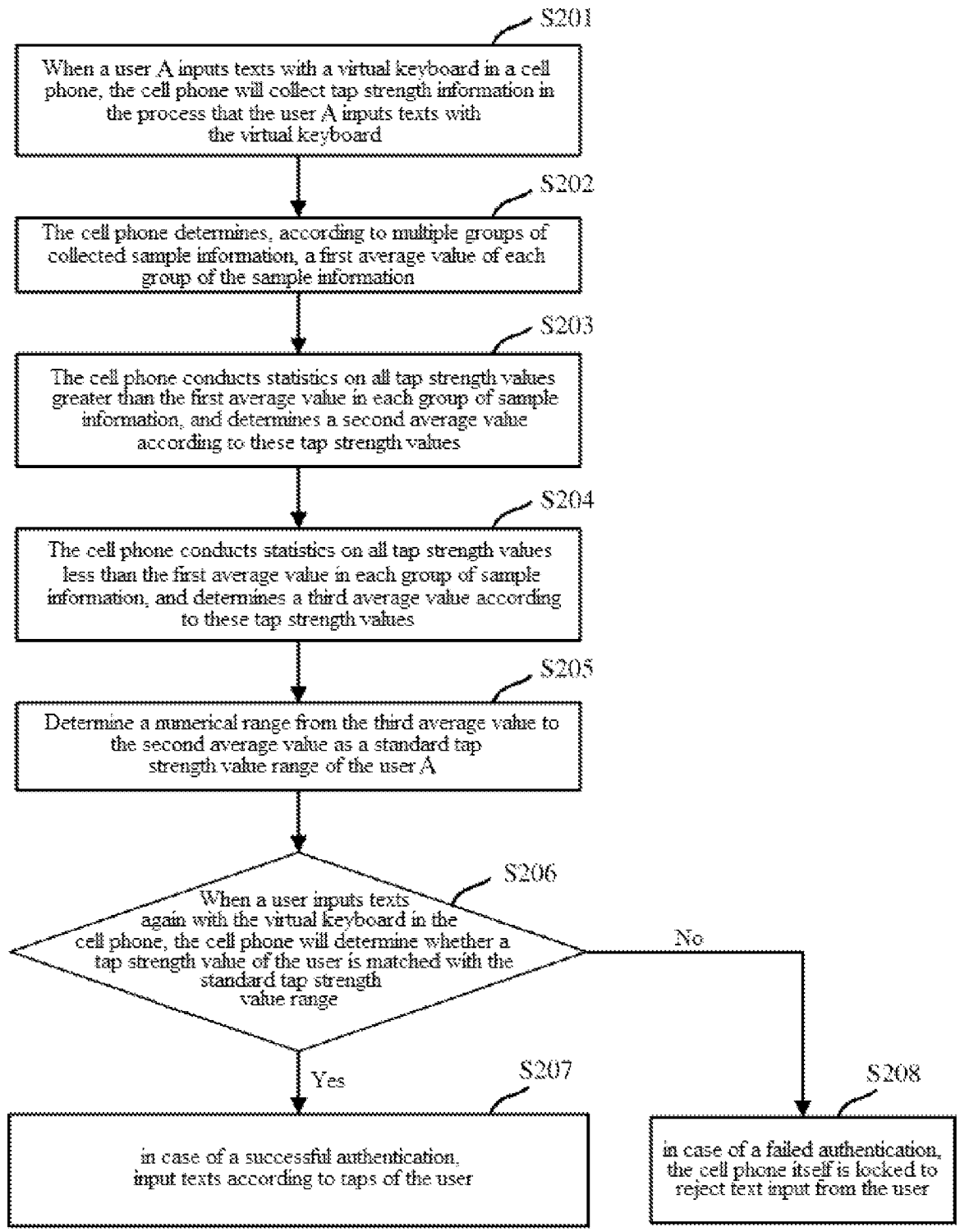
FIG. 2 is a process of identity authentication in an actual application scenario according to an embodiment of the present application.

As shown in FIG. 2, an application for identity authentication in the embodiment of the present application is as follows:

In this scenario, the terminal is a cell phone having a touch screen function, and it is set that user A is a frequent user of the cell phone, the specified operation is inputting texts with a virtual keyboard, the action attribute information is a tap strength value of a finger on the screen of the cell phone when the user A inputs texts, and when collecting tap strength values of the user, the cell phone may collect 10 tap actions successively. Then:

Steps S201 to S205 are a process of setting the standard information, and steps S206 to S208 are a process of performing authentication according to the standard information.

S201: When the user A inputs texts with the virtual keyboard in the cell phone, the cell phone may collect tap strength values of the user A in the process that the user A inputs texts with the virtual keyboard.

Figure 3A:
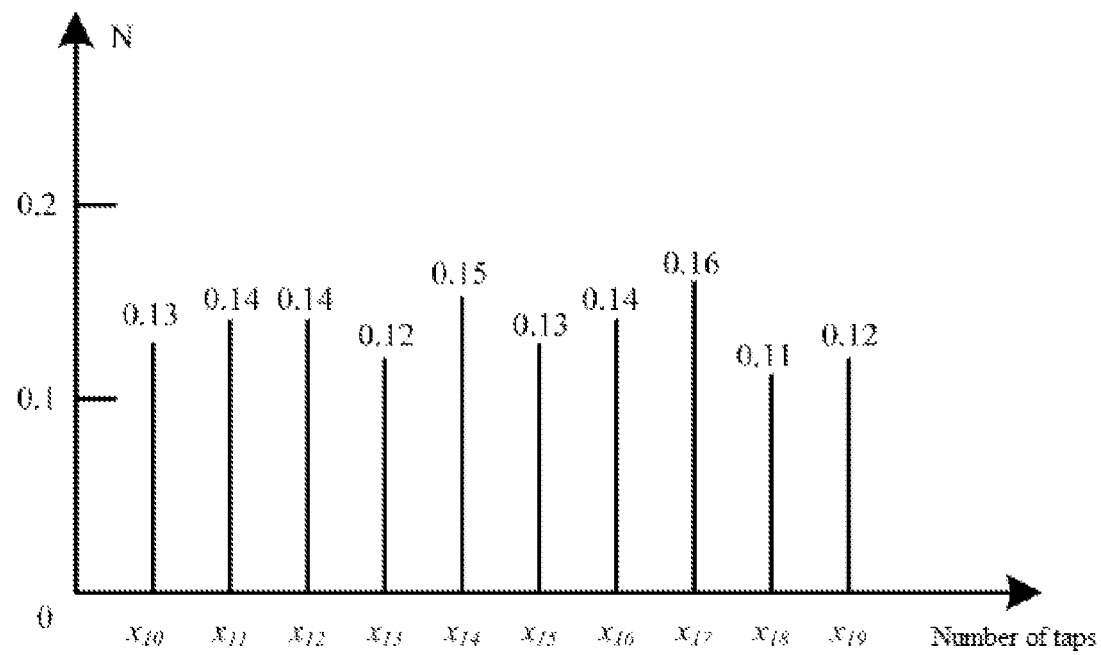
FIG. 3*a* is a group of tap strength values collected by a cell phone in the process of setting action attribute information according to an embodiment of the present application.

The cell phone may collect the tap strength values for multiple times when the user A inputs texts with the virtual keyboard, to form n groups of sample information: $X_1, X_2, \ldots, X_n$. FIG. 3a shows the sample information $X_1$ of a group of tap strength values collected by the cell phone, in which the ordinate indicates the tap strength, in the unit of N (that is, the mechanical unit Newton), and the abscissa indicates the number of taps. In FIG. 3a, the group of sample information $X_1$ is formed by ten tap strength values, that is, $x_{10}, x_{11}, \ldots, x_{19}$ (the size of each tap strength value is shown in FIG. 3a). Likewise, each of the remaining multiple groups of sample information $X_i$ also includes ten tap strength values $x_{i0}, x_{i1}, \ldots, x_{i9}$, $i=2, \ldots, n$ (but the remaining multiple groups of sample information X are not shown in the figure). Each tap strength value is precise to the hundredths, and in an actual application, to improve the precision, the cell phone may collect the tap strength values precise to the thousandths or ten thousandths.

The tap strength values of the user A are collected by a pressure sensor inside the cell phone, and the pressure sensor may convert an external pressure into an electrical signal on the basis of the piezoelectric effect and send the electrical signal to a processor inside the cell phone, thereby determining the tap strength value applied to the screen of the cell phone. Definitely, the present application is not limited to the above manner of collecting the tap strength values.

S202: The cell phone determines, according to collected multiple groups of sample information, a first average value of the multiple groups of sample information.

The first average value is represented as $\overline{X}$, and $\overline{X}$ is obtained by averaging the tap strength values of the sample information, that is:

$$\overline{X} = \frac{X_1 + X_2 + \ldots X_n}{10n} = \frac{x_{10} + \ldots + x_{19} + x_{20} + \ldots + x_{29} + \ldots + x_{n0} + \ldots + x_{n9}}{10n}$$

Therefore, the first average value reflects the average magnitude of tap strengths when the user A inputs texts with the virtual keyboard on the cell phone. In this scenario, $\overline{X}=0.14$.

S203: The cell phone conducts statistics on all tap strength values greater than the first average value in the multiple groups of sample information, and determines a second average value according to these tap strength values.

The second average value is represented as $\overline{H}$, that is, all tap strength values greater than 0.14 in the multiple groups of sample information are averaged. For ease of representation, it is set herein that there are a total of h tap strength values greater than 0.14, and these tap strength values are represented as $H_{ij}$, wherein (i=1, 2, . . . , h; j=0, 1, . . . , 9); then, $\overline{H}$ is expressed as follows:

$$\overline{H} = \frac{\sum H_{ij}}{h},$$

wherein (x=1, 2, . . . , h; j=0, 1, . . . , 9), and
in this scenario, $\overline{H}=0.15$.

S204: The cell phone conducts statistics on all tap strength values less than the first average value in the multiple groups of sample information, and determines a third average value according to these tap strength values.

The third average value is represented as $\overline{L}$, that is, all tap strength values less than 0.14 in the multiple groups of sample information are averaged. For ease of representation, it is set herein that there are a total of l tap strength values less than 0.14, and the tap strength values are represented as $L_{ij}$, wherein (i=1, 2, . . . , l; j=0, 1, . . . , 9); then, $\overline{L}$ is expressed as follows:

$$\overline{L} = \frac{\sum L_{ij}}{h},$$

wherein (i=1, 2, . . . , l; j=0, 1, . . . , 9), and
in this scenario, $\overline{L}=0.13$.

The second average value $\overline{H}$ and the third average value $\overline{L}$ determined through the steps S203 and S204 reflect an average maximum value and an average minimum value of tap strengths of the user A using the cell phone, respectively, such that an upper limit and a lower limit of the tap strength values are obtained, thereby determining a range of tap strength values when the user A operates the cell phone, that is, step S205.

S205: Determine a numerical range from the third average value $\overline{L}$ to the second average value $\overline{H}$ as a standard tap strength value range of the user A.

Figure 3B:
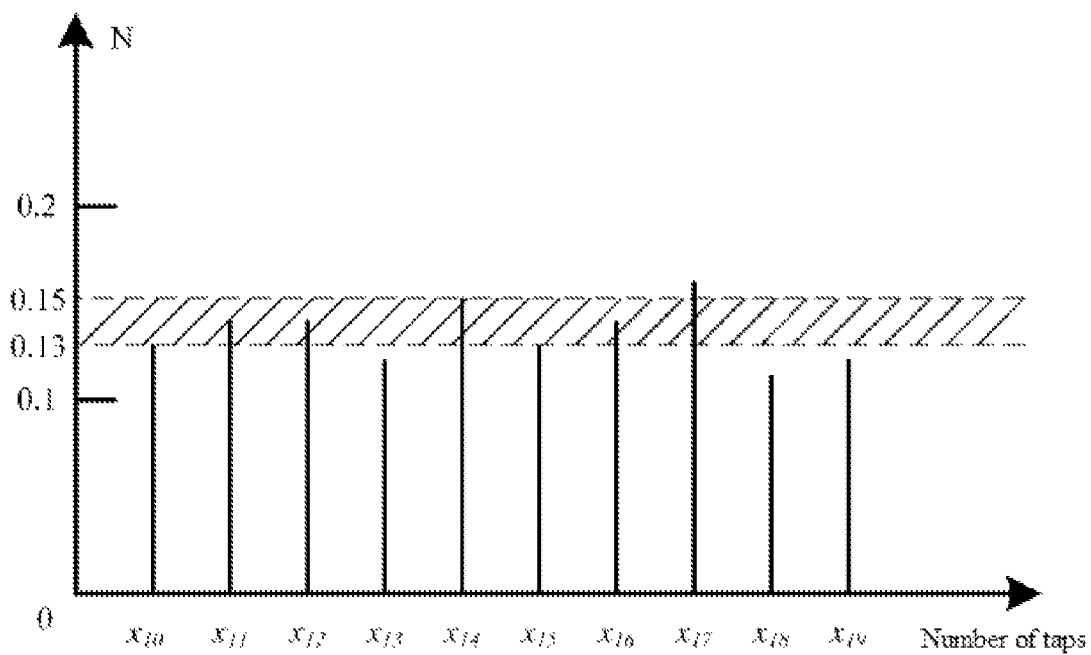
FIG. 3*b* is a schematic diagram of a standard tap strength value range according to an embodiment of the present application.

The standard tap strength value range is represented as $[\overline{L}, \overline{H}]$, wherein, as shown in FIG. 3b, the standard tap strength value range is shown on the sample information $X_1$ of the tap strength values, shown in FIG. 3a, and the shadow area in FIG. 3b is the standard tap strength value range.

Here, referring to FIG. 3b, the standard tap strength value range of the user A is determined as [0.13, 0.15], and it can be seen from FIG. 3b that, even if a tap action is performed by the user A, a corresponding tap strength value thereof does not always fall within the standard tap strength value range, and in FIG. 3b, there are three tap strength values less than the third average value $\overline{L}=0.13$, and there is one tap strength value greater than the second average value $\overline{H}=0.15$. Therefore, in this scenario, the tap strength value of the user does not need to completely match with the standard tap strength value range; instead, matching authentication is conducted by setting a similarity threshold.

Specifically, by using the 10 tap actions of the user A shown in FIG. 3b as an example, tap strength values generated by 4 taps do not fall within the standard tap strength value range, then, the number of tap actions falling in the standard tap strength value range accounts for 60% of the total number of tap actions, and here, the similarity threshold is set to 60%.

S206: When a user inputs texts again with the virtual keyboard in the cell phone, the cell phone may determine whether a tap strength value of the user is matched with the standard tap strength value range, and if yes, performs step S207; otherwise, performs step S208.

Figure 4:
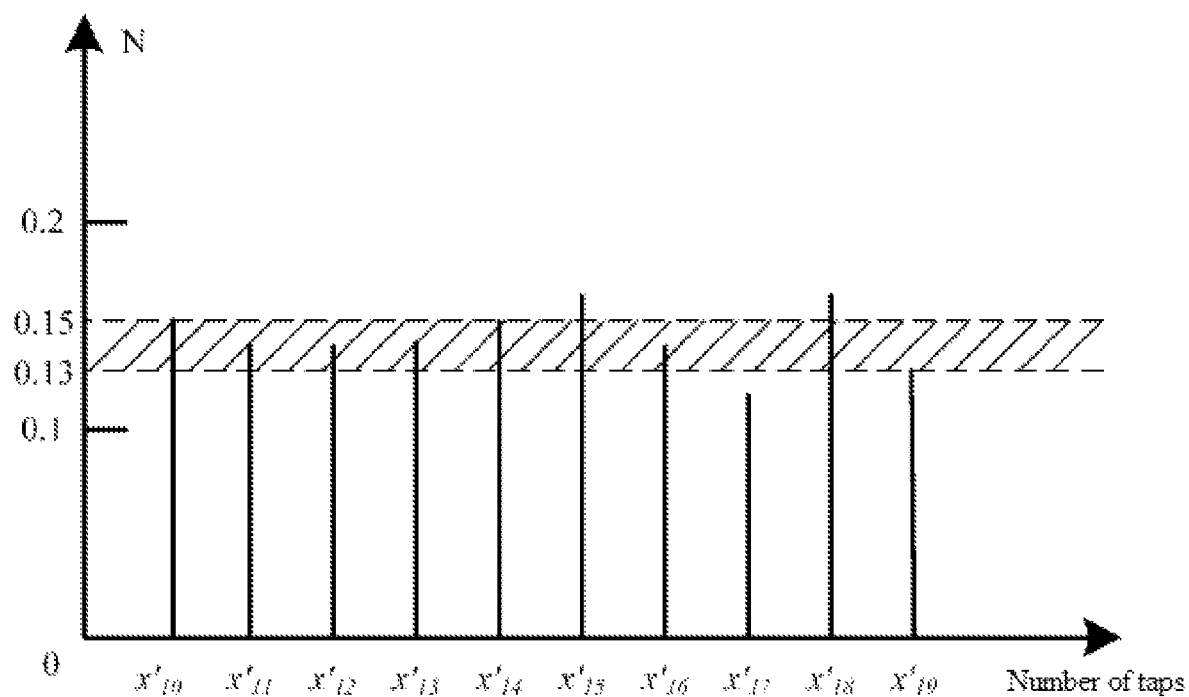
FIG. 4 is a schematic diagram of matching a group of tap strength values collected by a cell phone with a standard tap strength value range according to an embodiment of the present application.

During authentication, tap strength values of the 10 tap actions of the user collected by the cell phone are shown in FIG. 4, wherein tap strength values generated by 3 taps do not fall within the standard tap strength value range, then, the number of tap actions falling within the standard tap strength value range accounts for 70% of the total number of tap actions, which is higher than the preset similarity threshold 60%, that is, the tap strength value when the user inputs texts with the virtual keyboard is matched with the standard tap strength value range. Therefore, it is considered that the user A is using the cell phone, and thus step S207 is performed.

S207: The authentication is successful, and input texts according to taps of the user.

S208: The authentication is failed, and the cell phone is locked to reject text input from the user.

If the number of times that the tap strength values corresponding to the 10 tap actions collected by the cell phone fall within the standard tap strength value range is less than 6, that is, a percentage of the number of tap actions falling within the standard tap strength value range to the total number of tap actions is less than the preset similarity threshold (60%), it is considered that it is not the user A who is using the cell phone, and step S208 is performed.

In an actual application scenario, the sample information $x_i$ approximately complies with normal distribution, that is $x_i \sim (\mu, \sigma^2)$, and therefore, in addition to presetting the action attribute value range by using the first, second, and third average values, the action attribute value range may also be preset by using characteristics of the normal distribution. Now, still taking the values in FIG. 3a as an example, in FIG. 3a, the first average value $\overline{X}=0.14$, that is, $\mu$ of the normal distribution is 0.14, and a standard deviation $\sigma^2$ is a fluctuation range of deviation from the average value $\mu$, that is:

$$\sigma = \sqrt{\frac{1}{N} \sum_{i=1}^{N} (x_i - \mu)^2}$$

wherein, N is the number of samples, that is, 10n, $x_i$ is each action attribute value, and here, $\sigma=0.1$, and a distribution interval $(\mu-\sigma, \mu+\sigma)$ of the normal distribution is (0.13, 0.15), that is, the upper and lower limits of the action attribute value range may be determined according to the average value and the standard deviation, thereby determining the action attribute value range.

It should be noted that, the application scenario is not used to limit the present application. The application for identity authentication in the present application is not only applicable to an operation of the user inputting texts with the virtual keyboard of the cell phone, but also applicable to user operations such as tapping an application of the mobile terminal and sliding on a screen to unlock.

In another application scenario, it is still set that the terminal is a cell phone, while the specified operation performed by the user is a call answering process of the user, and the action attribute information is acceleration information. In this process, the cell phone starts a collection thread when the user slides on the screen to answer or taps a dial key, and records acceleration information in the process that the user raises the cell phone from a certain height to the ear for conversation, wherein, the acceleration information includes: an acceleration value and an acceleration direction.

Figure 5:
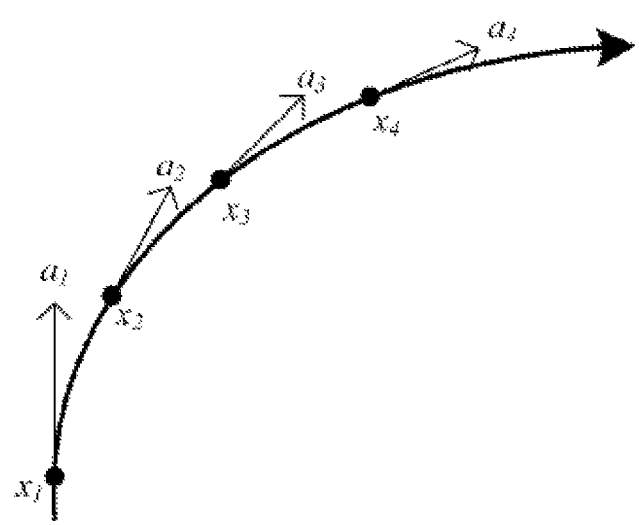
FIG. 5 is a schematic diagram of acceleration information at multiple moments collected by a cell phone according to an embodiment of the present application.

As the process that the user raises the cell phone includes successive actions, the cell phone may divide the process into multiple moments, and collect acceleration information at the multiple moments respectively. As shown in FIG. 5, the cell phone may conduct collection for 4 times in the whole process, that is, collect at $x_1 \sim x_4$, to obtain acceleration information $\vec{a_i}$ of the positions respectively, wherein (i=1, 2, 3, 4).

The acceleration information $\vec{a_i}$ includes an acceleration value and motion direction information. In the cell phone, the acceleration value and the motion direction information of the cell phone are both determined by a three-axis gyroscope. The motion direction is determined by the three-axis gyroscope according to a space coordinate system, and the three-axis gyroscope converts the motion direction information of the cell phone into motion direction angle information in the space coordinate system, and therefore, the acceleration information $\vec{a_i}$ may be represented as $(|\vec{a_i}|, \theta_i)$, wherein $|\vec{a_i}|$ represents a value of the acceleration information $\vec{a_i}$, $\theta_i$ represents an angle value corresponding to the direction of the acceleration information $\vec{a_i}$. According to $(|\vec{a_i}|, \theta_i)$, first average values thereof may be determined respectively. Here, $\overline{|\vec{a_i}|}$ is used to represent the first average value of $|\vec{a_i}|$, and $\overline{\theta_i}$ is used to represent the first average value of $\theta_i$. Then, $|\vec{a_i}|$ and $\theta_i$ that are greater than respective first average values and less than respective first average values are averaged, to obtain respective second and third average values of $|\vec{a_i}|$ and $\theta_i$, here, $\overline{|\vec{a_i}|}_H$ and $\overline{|\vec{a_i}|}_L$ are used to represent the second and third average values of $|\vec{a_i}|$ respectively, and $\overline{\theta}_{i_H}$ and $\overline{\theta}_{i_L}$ are used to present the second and third average values of $\theta_i$ respectively, such that an acceleration value range $[\overline{|\vec{a_i}|}_L, \overline{|\vec{a_i}|}_H]$ and a motion direction angle value range $[\overline{\theta}_{i_L}, \overline{\theta}_{i_H}]$ are determined, and are used as sample information to match with subsequently collected acceleration information. It should be noted that, for $|\vec{a_i}|$ and $\theta_i$, matching and authentication are performed by setting a similarity threshold.

During matching, matching of $|\vec{a_i}|$ is emphasized, that is, a greater weight is granted to $|\vec{a_i}|$. This is because $|\vec{a_i}|$ reflects the magnitude of an applied force and the speed of an action in the process that the user raises the phone. Here, $F(|\vec{a_i}|)w_1 + F(\theta_i)w_2$ is used for matching, wherein, $w_1$ represents a weight of $|\vec{a_i}|$, $w_2$ represents a weight of $\theta_i$, $F(|\vec{a_i}|)$ represents a proportion of the collected $|\vec{a_i}|$ falling within the acceleration value range $[|\vec{a_i}|_L, |\vec{a_i}|_H]$, and $F(\theta_i)$ represents a proportion of the collected $\theta_i$ falling within the motion direction angle value range $[\overline{\theta}_{i_L}, \overline{\theta}_{i_H}]$. Therefore, if the proportion value determined by the weighting process is greater than the preset similarity threshold, the authentication is successful; otherwise, the authentication is failed.

Definitely, reference can be made to the content of the above actual application for the specific process, which is not repeated herein.

It should be noted that, for the process of identity authentication in the embodiment of the present application, in the case where the authentication is failed, in addition to that the terminal directly rejects the operation of the user, action attribute information after the authentication is failed may be sent to a risk control system running at the background of the terminal for further judgment, and this does not constitute a limitation to the present application.

Figure 6:
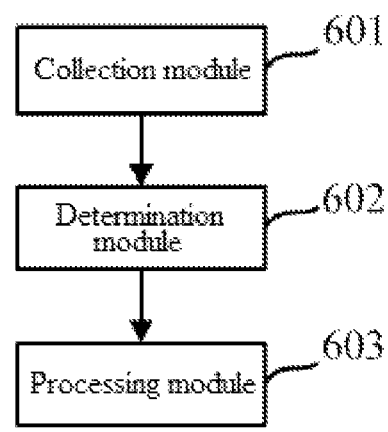
FIG. 6 is a schematic structural diagram of a device for identity authentication according to an embodiment of the present application.

The method for identity authentication according to the embodiment of the present application is described in the foregoing, and based on the same idea, an embodiment of the present application further provides a device for identity authentication, as shown in FIG. 6.

The device for identity authentication in FIG. 6 is set in a terminal, and the device includes: a collection module 601, a determination module 602, and a processing module 603.

The collection module 601 is configured to collect, when a user performs a specified operation, action attribute information of the user in the process of the specified operation, wherein the action attribute information includes one or more of applied force information and acceleration information.

The determination module 602 is configured to determine, according to preset standard information, whether the action attribute information is matched with the standard information.

The processing module 603 is configured to: when the determination module 602 determines that the action attribute information is matched with the standard information, the authentication being successful, perform corresponding processing according to the specified operation; and when the determination module determines that the action attribute information is not matched with the standard information, the authentication being failed, refuse to perform the corresponding processing according to the specified operation.

The determination module 602 is specifically configured to: generate sample information according to the action attribute information in each process of performing the specified operation, the action attribute information in each process of performing the specified operation being collected by the collection module 601 in advance each time when the user performs the specified operation, determine an action attribute value range according to the sample information, and set the action attribute value range as the standard information.

The process of setting the standard information is also implemented by the determination module 602, that is, the determination module 602 is specifically configured to: determine a first average value of the sample information according to the sample information; determine a second average value of sample information greater than the first average value; determine a third average value of sample information not greater than the first average value; and determine a numerical range from the third average value to the second average value as the action attribute value range.

The determination module 602 is specifically configured to: determine whether an attribute value included in the action attribute information falls in the action attribute value range; if yes, determine that the action attribute information is matched with the standard information; otherwise, determine that the action attribute information is not matched with the standard information.

In a typical configuration, a computer device includes one or more processors (CPU), an input/output interface, a network interface, and a memory.

The memory may include a volatile memory, a random access memory (RAM) and/or a non-volatile memory or the like in a computer readable medium, for example, a read only memory (ROM) or a flash RAM. The memory is an example of the computer readable medium.

The computer readable medium includes non-volatile and volatile media as well as movable and non-movable media, and can implement information storage by means of any method or technology. Information may be a computer readable instruction, a data structure, a module of a program or other data. A storage medium of a computer includes, for example, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and can be used to store information accessible to the computing device. According to the definition of this text, the computer readable medium does not include transitory media, such as a modulated data signal and a carrier.

It should be further noted that, the term "include", "comprise" or other variations thereof are intended to cover non-exclusive inclusion, so that a process, method, product or device including a series of elements not only includes the elements, but also includes other elements not clearly listed, or further includes inherent elements of the process, method, product or device. In a case without any more limitations, an element defined by "including a . . . " does not exclude that the process, method, product or device including the element further has other identical elements.

Persons skilled in the art should understand that, the embodiments of the present application may be provided as a method, a system, or a computer program product. Therefore, the present application may be implemented as a completely hardware embodiment, a completely software embodiment, or an embodiment combing software and hardware. Moreover, the present application may be a computer program product implemented on one or more computer usable storage media (including, but not limited to, a magnetic disk memory, a CD-ROM, an optical memory, and the like) including computer usable program code.

The above descriptions are merely embodiments of the present application, and are not intended to limit the present application. For persons skilled in the art, the present application may have various modifications and variations. Any modification, equivalent replacement, improvement or the like made without departing from the spirit and principle of the present application should all fall within the scope of claims of the present application.

The invention claimed is:

1. A method, comprising:
collecting a plurality of actions of a user performed on a terminal, wherein the plurality of actions correspond to a specified operation;
determining a plurality of standard value ranges corresponding to the specified operation, wherein the plurality of standard value ranges comprise a standard motion value range and a standard pressure value range;
determining whether a threshold percentage of the plurality of actions falls within the plurality of standard value ranges, by:
determining motion information of the terminal based on the plurality of actions of the user;
determining pressure information of a plurality of taps based on the plurality of actions of the user;
determining whether the threshold percentage of the motion information of the terminal falls within the standard motion value range;
determining whether the threshold percentage of the pressure information falls within the standard pressure value range;
if determining that a threshold percentage of the plurality of actions falls within the plurality of standard value ranges, performing the specified operation corresponding to the plurality of standard value ranges; and
if determining that a threshold percentage of the plurality of actions does not fall within the plurality of standard value ranges, refusing to perform the specified operation corresponding to the plurality of standard value ranges.

2. The method according to claim 1, wherein determining whether a threshold percentage of the plurality of actions falls within the plurality of standard value ranges comprises:
determining acceleration information based on the plurality of actions of the user;
determining whether a threshold percentage of the acceleration information falls within a standard acceleration value range.

3. The method according to claim 1, wherein collecting the plurality of actions of the user performed on the terminal comprises:
collecting a predetermined number of actions as the plurality of actions of the user.

4. The method according to claim 1, wherein the specified operation corresponding to the plurality of standard value ranges is determined based on the plurality of actions of a user.

5. The method according to claim 4, wherein the plurality of actions of the user comprise sliding to unlock a lock-screen interface of the terminal; and
wherein the specified operation corresponding to the plurality of standard value ranges comprises unlocking the terminal.

6. The method according to claim 1, wherein the specified operation corresponding to the plurality of standard value ranges comprises answering a call on the terminal.

7. The method according to claim 1, wherein the specified operation corresponding to the plurality of standard value ranges comprises starting an application on the terminal.

8. The method according to claim 1, wherein the specified operation corresponding to the plurality of standard value ranges comprises authenticating the user.

9. A system, comprising one or more processors and one or more non-transitory computer-readable memories coupled to the one or more processors and configured with instructions executable by the one or more processors to cause the system to perform operations comprising:
collecting a plurality of actions of a user performed on a terminal, wherein the plurality of actions correspond to a specified operation;
determining a plurality of standard value ranges corresponding to the specified operation, wherein the plurality of standard value ranges comprise a standard motion value range and a standard pressure value range;
determining whether a threshold percentage of the plurality of actions falls within the plurality of standard value ranges, by:
determining motion information of the terminal based on the plurality of actions of the user;
determining pressure information of a plurality of taps based on the plurality of actions of the user;
determining whether the threshold percentage of the motion information of the terminal falls within the standard motion value range;
determining whether the threshold percentage of the pressure information falls within the standard pressure value range;
if determining that a threshold percentage of the plurality of actions falls within the plurality of standard value ranges, performing the specified operation corresponding to the plurality of standard value ranges; and
in response to if determining that a threshold percentage of the plurality of actions does not fall within the plurality of standard value ranges, refusing to perform the specified operation corresponding to the plurality of standard value ranges.

10. The system of claim 9, wherein determining whether a threshold percentage of the plurality of actions falls within the plurality of standard value ranges comprises:
determining acceleration information based on the plurality of actions of the user;
determining whether a threshold percentage of the acceleration information falls within a standard acceleration value range.

11. The system of claim 9, wherein collecting the plurality of actions of the user performed on the terminal comprises:
collecting a predetermined number of actions as the plurality of actions of the user.

12. The system of claim 9, wherein the specified operation corresponding to the plurality of standard value ranges is determined based on the plurality of actions of a user.

13. The system of claim 12, wherein the plurality of actions of the user comprise sliding to unlock a lock-screen interface of the terminal; and
wherein the specified operation corresponding to the plurality of standard value ranges comprises unlocking the terminal.

14. The system of claim 9, wherein the specified operation corresponding to the plurality of standard value ranges comprises answering a call on the terminal.

15. A non-transitory computer-readable storage medium configured with instructions executable by one or more processors to cause the one or more processors to perform operations comprising:
collecting a plurality of actions of a user performed on a terminal, wherein the plurality of actions correspond to a specified operation;
determining a plurality of standard value ranges corresponding to the specified operation, wherein the plurality of standard value ranges comprise a standard motion value range and a standard pressure value range;

determining whether a threshold percentage of the plurality of actions falls within the plurality of standard value ranges, by:

determining motion information of the terminal based on the plurality of actions of the user;

determining pressure information of a plurality of taps based on the plurality of actions of the user;

determining whether the threshold percentage of the motion information of the terminal falls within the standard motion value range;

determining whether the threshold percentage of the pressure information falls within the standard pressure value range;

if determining that a threshold percentage of the plurality of actions falls within the plurality of standard value ranges, performing the specified operation corresponding to the plurality of standard value ranges; and if determining that a threshold percentage of the plurality of actions does not fall within the plurality of standard value ranges, refusing to perform the specified operation corresponding to the plurality of standard value ranges.

16. The non-transitory computer-readable storage medium of claim 15, wherein determining whether a threshold percentage of the plurality of actions falls within the plurality of standard value ranges comprises:

determining acceleration information based on the plurality of actions of the user;

determining whether a threshold percentage of the acceleration information falls within a standard acceleration value range.

17. The non-transitory computer-readable storage medium of claim 15, wherein collecting the plurality of actions of the user performed on the terminal comprises:

collecting a predetermined number of actions as the plurality of actions of the user.

* * * * *

UNITED STATES PATENT AND TRADEMARK OFFICE
CERTIFICATE OF CORRECTION

PATENT NO. : 10,795,978 B2
APPLICATION NO. : 16/804768
DATED : October 6, 2020
INVENTOR(S) : Yan Yin Page 1 of 1

It is certified that error appears in the above-identified patent and that said Letters Patent is hereby corrected as shown below:

In the Claims

Claim 9, Column 14, Line 29:
"in response to if determining that" should read -- if determining that --.

Signed and Sealed this
Fifth Day of September, 2023

*Katherine Kelly Vidal*

Katherine Kelly Vidal
*Director of the United States Patent and Trademark Office*